United States Patent
Quinn et al.

(10) Patent No.: US 10,935,322 B2
(45) Date of Patent: Mar. 2, 2021

(54) SHELL AND TUBE HEAT EXCHANGER WITH PERFORATED FINS INTERCONNECTING THE TUBES

(71) Applicant: Hamilton Sundstrand Corporation, Charlotte, NC (US)

(72) Inventors: Gregory John Quinn, Windsor, CT (US); Mark A. Zaffetti, Suffield, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 77 days.

(21) Appl. No.: 16/128,032

(22) Filed: Sep. 11, 2018

(65) Prior Publication Data
US 2020/0080789 A1    Mar. 12, 2020

(51) Int. Cl.
 F28D 7/10 (2006.01)
 F28F 9/00 (2006.01)
 F28F 1/06 (2006.01)
(52) U.S. Cl.
 CPC ............. *F28D 7/106* (2013.01); *F28F 1/06* (2013.01); *F28F 9/00* (2013.01)
(58) Field of Classification Search
 CPC .......... F28D 7/106; F28D 7/1653; F28D 7/16; F28F 1/06; F28F 9/00
 USPC ....................................................... 165/144
 See application file for complete search history.

(56) References Cited

U.S. PATENT DOCUMENTS

| | | | | |
|---|---|---|---|---|
| 948,835 A | * | 2/1910 | Walter | F28F 9/22 165/160 |
| 1,525,094 A | * | 2/1925 | Jones | F28F 9/22 165/161 |
| 1,853,236 A | * | 4/1932 | Shadle | B01D 45/16 95/269 |
| 4,588,024 A | * | 5/1986 | Murray | F28F 9/22 165/109.1 |
| 4,807,696 A | | 2/1989 | Colvin et al. | |
| 5,181,560 A | | 1/1993 | Burn | |
| 5,193,357 A | * | 3/1993 | Kohl | B21C 23/10 62/347 |
| 5,220,954 A | | 6/1993 | Longardner et al. | |
| 7,740,057 B2 | * | 6/2010 | Wang | F28D 7/1607 165/159 |
| 9,464,847 B2 | | 10/2016 | Maurer et al. | |
| 2011/0030915 A1 | | 2/2011 | Best | |
| 2017/0003079 A1 | | 1/2017 | Sun et al. | |
| 2018/0043482 A1 | | 2/2018 | Vos et al. | |
| 2018/0092252 A1 | | 3/2018 | Bouras | |

* cited by examiner

*Primary Examiner* — Tho V Duong
(74) *Attorney, Agent, or Firm* — Cantor Colburn LLP

(57) ABSTRACT

Disclosed is a tube assembly for a shell and tube heat exchanger, the tube assembly having: a plurality of tubes respectively extending in a lengthwise direction L to a respective plurality of opposing ends at respective opposing internal ends of the heat exchanger, the plurality of tubes being collectively arranged in a first grid pattern, wherein the plurality of tubes form a respective plurality of grid nodes; and a plurality of fins connecting the plurality of tubes to form a respective plurality of grid edges, the plurality of fins extending to opposing ends of the plurality of tubes, wherein the plurality of fins each include a plurality of through holes formed therein.

6 Claims, 6 Drawing Sheets

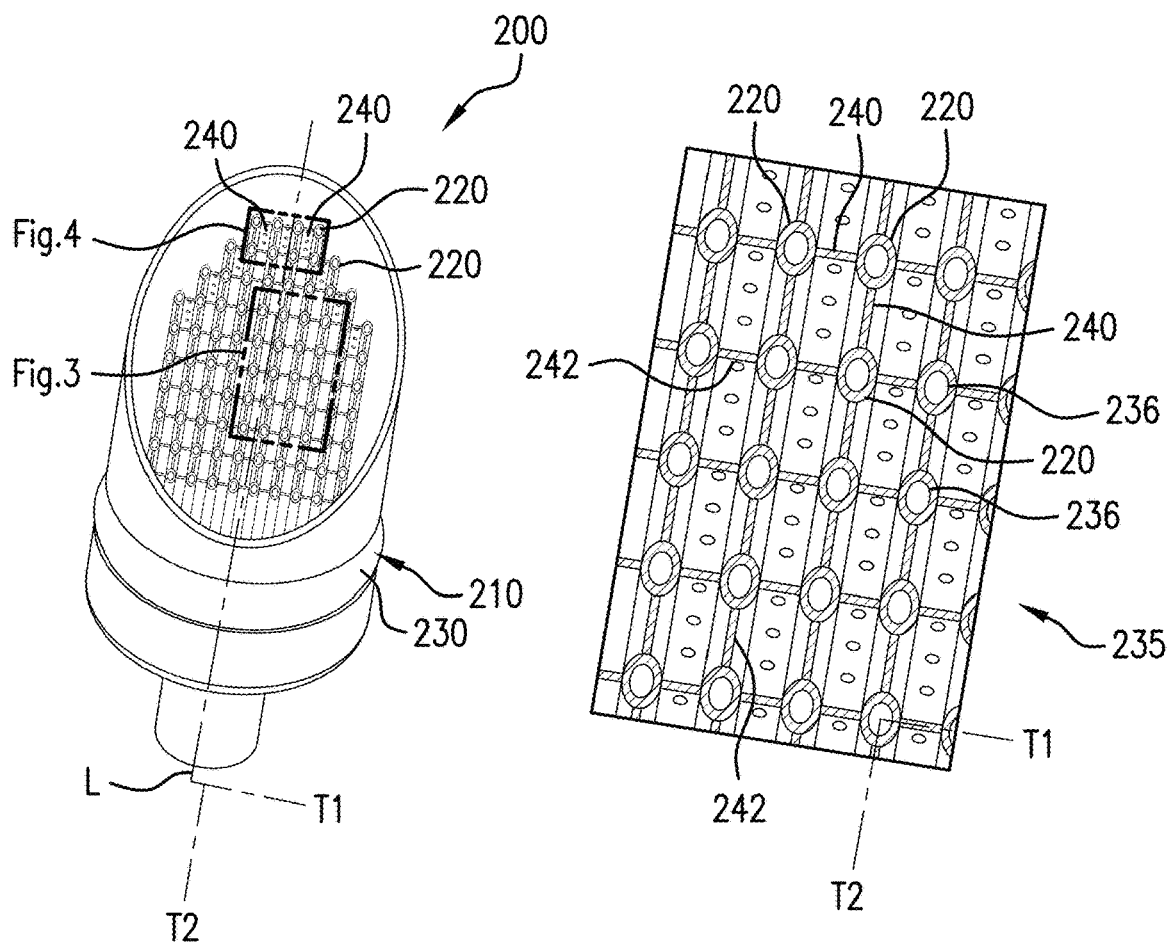
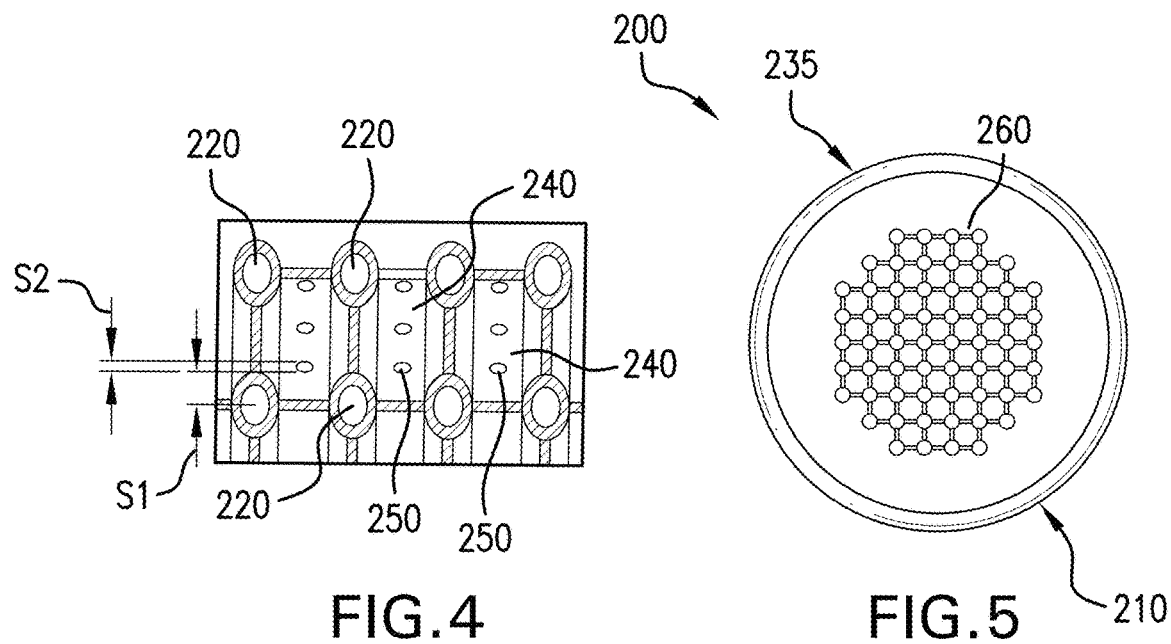

SHELL AND TUBE HEAT EXCHANGER WITH PERFORATED FINS INTERCONNECTING THE TUBES

STATEMENT OF FEDERAL SUPPORT

This invention was made with government support under NASA (National Aeronautics and Space Administration) Contract No. NNX17CJ04C, Subcontract No. 2017-4204MA awarded by NASA. The government has certain rights in the invention.

BACKGROUND

Exemplary embodiments pertain to shell and tube heat exchangers and more specifically to a shell and tube heat exchanger with perforated fins interconnecting the tubes.

A solid/liquid phase change material (PCM) may utilize latent heat characteristics of a fluid, such as water, or quasi fluid such as wax, to function as a heat sink and store thermal energy at a constant phase change temperature within a temperature control system. In a shell and tube heat exchanger, the PCM may expand or contract during the phase change, which may result in pressure tending to urge the tubes toward and away from each other as the PCM expands.

BRIEF DESCRIPTION

Disclosed is a tube assembly for a shell and tube heat exchanger, the tube assembly comprising: a plurality of tubes respectively extending in a lengthwise direction L to a respective plurality of opposing ends at respective opposing internal ends of the heat exchanger, the plurality of tubes being collectively arranged in a first grid pattern, wherein the plurality of tubes form a respective plurality of grid nodes; and a plurality of fins connecting the plurality of tubes to form a respective plurality of grid edges, the plurality of fins extending to opposing ends of the plurality of tubes, wherein the plurality of fins each include a plurality of through holes formed therein.

In addition to one or more of the above disclosed features and elements or as an alternate, each of the plurality of fins connects adjacent ones of the plurality of tubes.

In addition to one or more of the above disclosed features and elements or as an alternate, on each of the fins, the through holes are aligned in the lengthwise direction.

In addition to one or more of the above disclosed features and elements or as an alternate, the grid forms a row and column grid.

In addition to one or more of the above disclosed features and elements or as an alternate, at least a portion of the grid forms a square grid.

In addition to one or more of the above disclosed features and elements or as an alternate, a perimeter shape of the grid in the top view is an octagon.

In addition to one or more of the above disclosed features and elements or as an alternate, the tubes spiral about a transverse center for the grid to form a helical column, and the grid is arcuate.

In addition to one or more of the above disclosed features and elements or as an alternate, the transverse center of the assembly is tubeless and edgeless.

Further disclose is a shell and tube heat exchanger comprising: an inlet; an outlet; a cylindrical shell between the inlet and the outlet; and a tube assembly disposed within the cylindrical shell that fluidly connects the inlet and the outlet, the assembly including: a plurality of tubes respectively extending in a lengthwise direction L to a respective plurality of opposing ends at respective opposing internal ends of the heat exchanger, the plurality of tubes being collectively arranged in a first grid pattern, wherein the plurality of tubes form a respective plurality of grid nodes; and a plurality of fins connecting the plurality of tubes to form a respective plurality of grid edges, the plurality of fins extending to opposing ends of the plurality of tubes, wherein the plurality of fins each include a plurality of through holes formed therein.

In addition to one or more of the above disclosed features and elements or as an alternate, the heat exchanger comprises a PCM heat sink.

Further disclosed is a method of manufacturing a tube assembly for a shell and tube heat exchanger, the method comprising: (i) additively building a grid pattern in a lengthwise direction L, the grid pattern comprising a plurality of grid nodes having a circular shape in a top view and a plurality of continuous grid edges extending between adjacent ones of the grid nodes; (ii) further additively building within the grid pattern, between the nodes and aligned with the grid edges, a plurality of holes distribute in the lengthwise direction L, the plurality of holes being mutually spaced by a first span S1 and have a diameter S2; and (iii) repeating (i) and (ii) until reaching a predetermined tube assembly length, thereby forming a plurality of tubes extending in the lengthwise direction L and a respective plurality of fins connecting the adjacent ones of the plurality of tubes, wherein the plurality of fins each include a plurality of through holes distributed in the lengthwise direction.

BRIEF DESCRIPTION OF THE DRAWINGS

The following descriptions should not be considered limiting in any way. With reference to the accompanying drawings, like elements are numbered alike:

FIG. 2 is a perspective sectional view illustrating additional features of the tube configuration of the heat exchanger of FIG. 1;

FIG. 3 illustrates additional features of the configuration of FIG. 2 according to an embodiment;

FIG. 4 illustrates additional features of the configuration of FIG. 2 according to an embodiment;

FIG. 5 is another perspective sectional view illustrating additional features of the configuration of FIG. 2 according to an embodiment;

DETAILED DESCRIPTION

A detailed description of one or more embodiments of the disclosed apparatus and method are presented herein by way of exemplification and not limitation with reference to the Figures.

Figure 1:
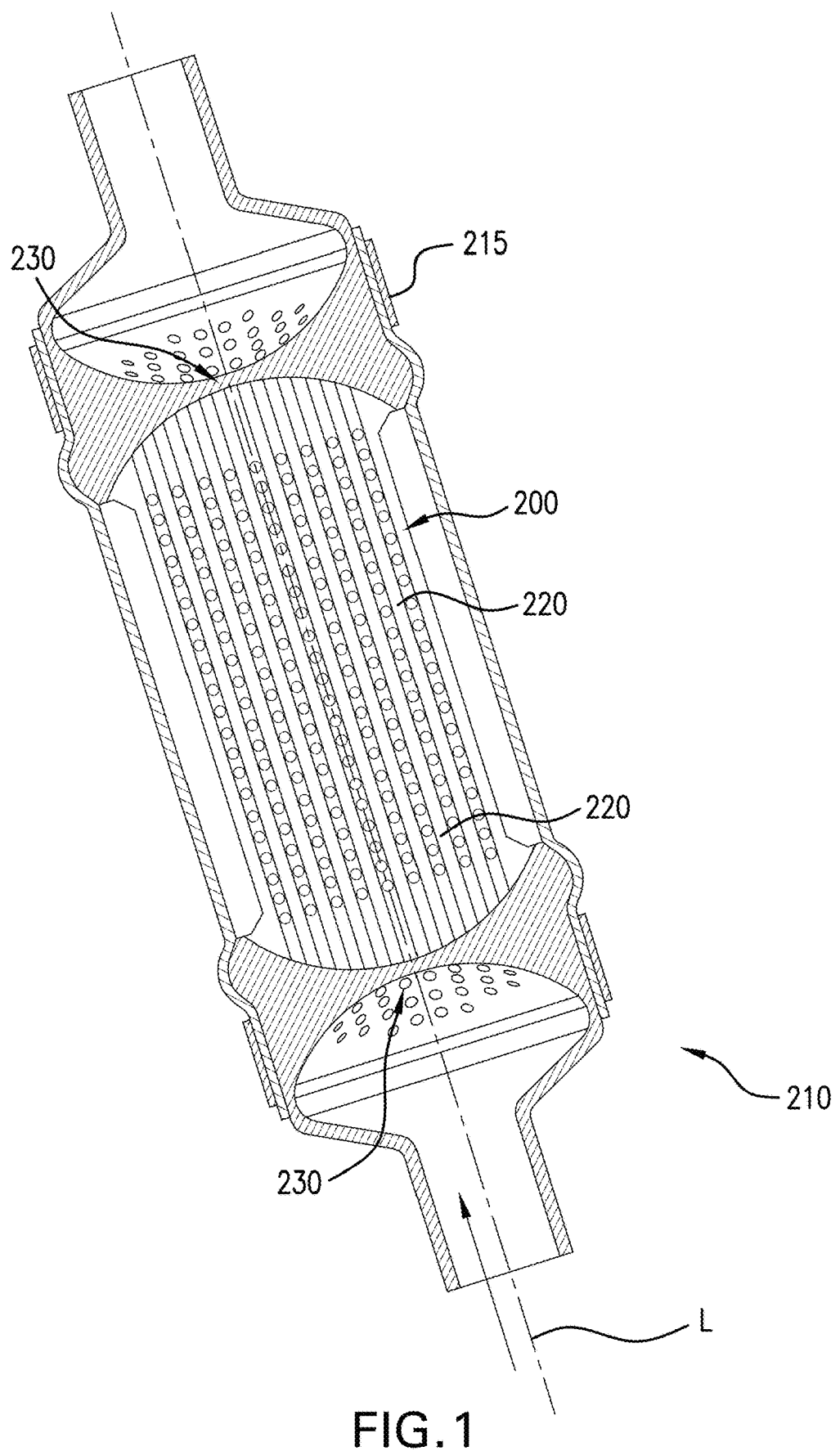
FIG. 1 is a side sectional view illustrating a tube configuration that may be housed within a shell and tube heat exchanger according to an embodiment.

Turning to FIG. 1, a shell and tube heat exchanger 210 is generally shown and includes a shell 215 that surrounds a tube assembly 200. The tube assembly 200 may comprise a plurality of tubes generally referenced as 220. The plurality of tubes 220 may respectively extend in a lengthwise direction L to a respective plurality of opposing ends generally referenced as 230. The opposing ends 230 may be proximate the respective internal opposing ends of the heat exchanger 210.

Turning to FIGS. 2 and 3, the plurality of tubes 220 may be collectively arranged in a first grid pattern that is a row-column grid pattern, wherein the first grid pattern is generally referenced as 235. In the first grid pattern 235 rows extend along a first transverse direction T1 and columns extend along a second transverse direction T2. In addition, in the first grid pattern 235 includes a plurality of grid nodes generally referenced as 236 at locations of the respective the plurality of tubes 220. In one embodiment the first grid pattern 235 is a square grid.

The assembly 200 may include a plurality of fins generally referenced as 240. In the first grid pattern, a plurality of grid edges generally referenced as 242 extend in the first transverse direction T1 and the second transverse direction T2 at locations of the respective plurality of fins 240. That is, each of the plurality of fins 240 connects adjacent ones of the plurality of tubes 220. The plurality of fins 240 extend in the lengthwise direction L between the plurality of opposing ends 230 of the plurality of tubes 220.

Turning to FIG. 4, the plurality of fins 240 may each comprise a plurality of through holes generally referred to as 250. On each of the plurality of fins 240, the plurality of through holes 250 may be mutually spaced in the lengthwise direction L, for example by a distance S1, and the through holes 250 may have a diameter defined as S2. The through holes 250 may be centered between adjacent ones of the plurality of tubes 220. Turning to FIG. 5, a perimeter shape 260 of the first grid pattern 235 in the top view may be an octagon. This may facilitate fitting the assembly 200 into the heat exchanger 210.

Figure 6:
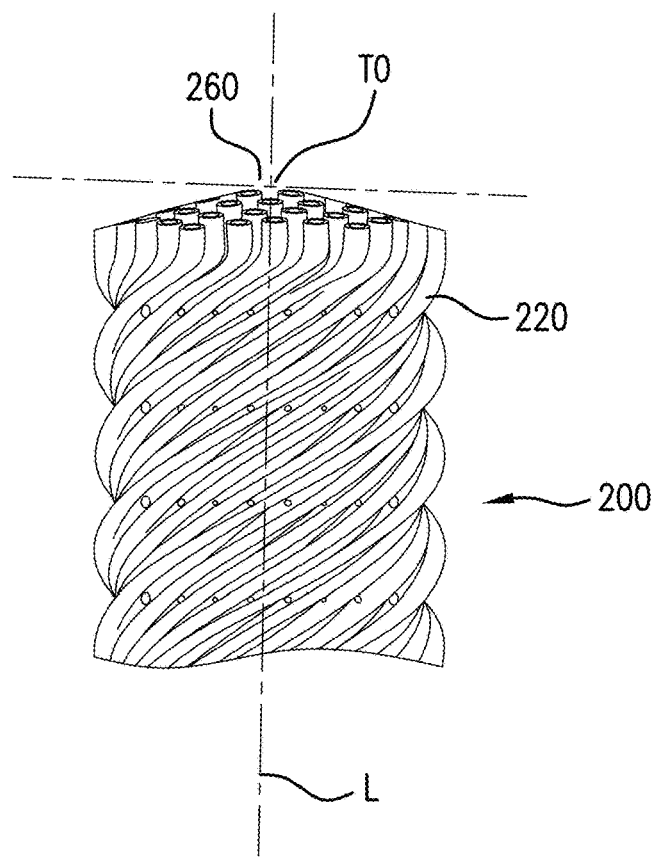
FIG. 6 is a side view illustrating features of another tube configuration according to an embodiment.

Turning to FIG. 6, in an alternative embodiment illustrated in a perspective and side view, respectively, the plurality of tubes 220 may spiral about an axis 260 extending along the lengthwise direction L and through a transverse center T0 for the assembly 200. With this arcuate grid configuration the assembly 200 may form a helical column with a cylindrical outer shape. The helical spiral need not be constant along length L but may be tighter or looser as the spiral progresses along length L. Such configuration may be obtained by applying additive manufacturing techniques.

Figure 7:
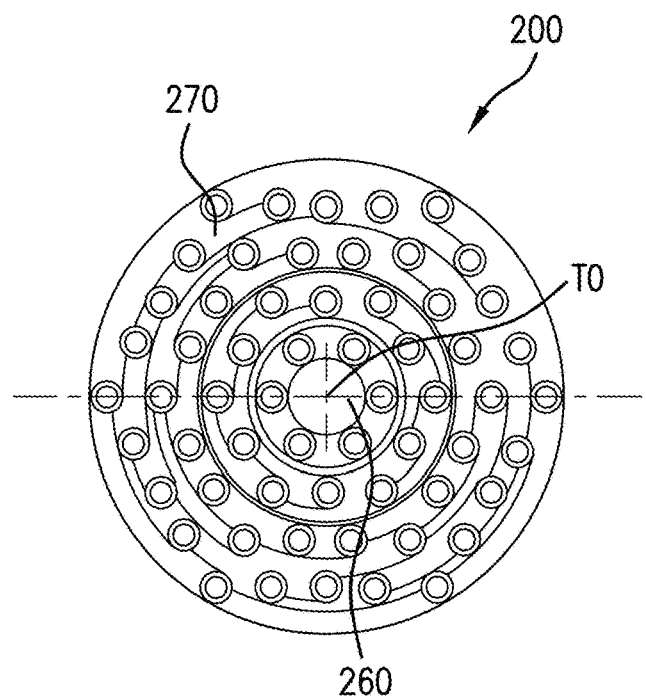
FIG. 7 is a top view illustrating additional features of the configuration of FIG. 6 according to an embodiment.

Turning to FIG. 7, this configuration of the assembly 200 may result in a second grid pattern that is an arcuate grid generally referenced as 270. In the second grid pattern 270 the transverse center T0 may be tubeless and edgeless. The result of the second grid pattern 270 is an effective increase in length for the tubes 220, which may enhance heat transfer.

Figure 8:
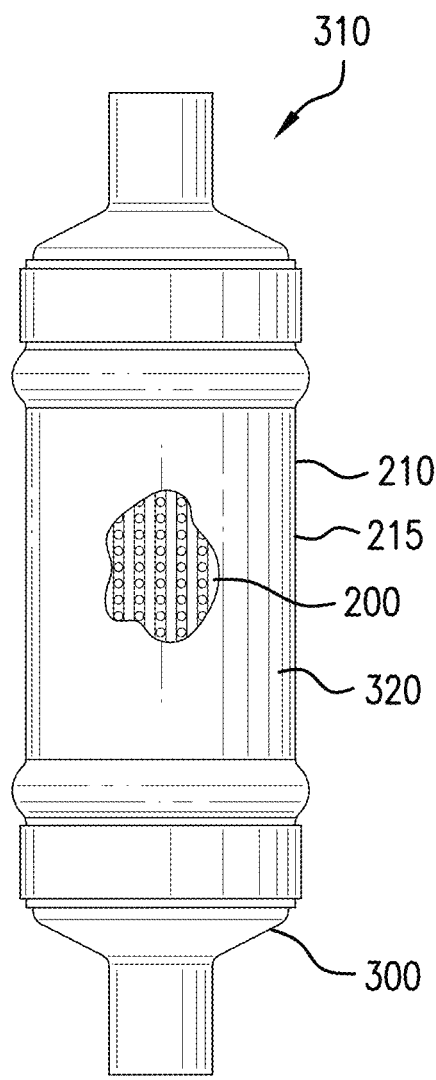
FIG. 8 is a side view illustrating additional features of a shell and tube heat exchanger according to an embodiment.

Turning to FIG. 8, further disclosed are additional features of the shell and tube heat exchanger 210. The heat exchanger 210 may comprise an inlet 300, an outlet 310, a cylindrical shell 215 therebetween, and the tube assembly 200, illustrated schematically, of one or more of the above embodiments. The tube assembly 200 may fluidly connect the inlet 300 and the outlet 310 of the heat exchanger 210. The cylindrical shell 215 may be elastic, e.g., to further allow for expansion of the PCM 330 therein.

Figure 9:
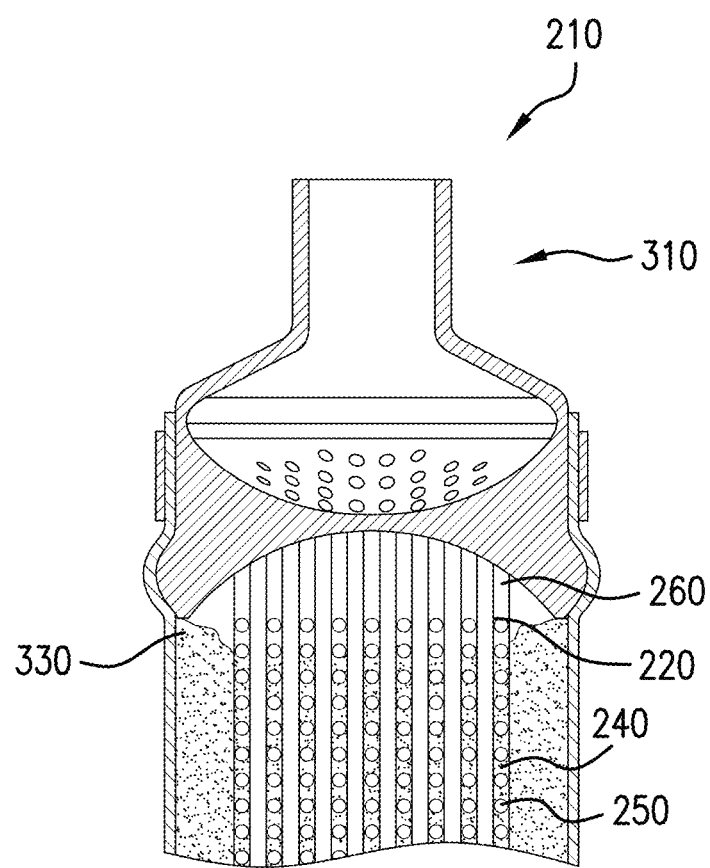
FIG. 9 is a side sectional view illustrating additional features of the shell and tube heat exchanger of FIG. 8 according to an embodiment.

Turning to FIG. 9, the heat exchanger 210 may include the PCM generally referenced as 330 in the shell 215. It is to be appreciated that the PCM 330 is a continuous mass within the heat exchanger 210. The PCM 330 may be water, paraffin wax, or other suitable material with a melting point meeting the utilization requirements. With the plurality of through holes 250 distributed among the plurality of fins 240, the PCM 330 may expand and contract in spaces between and around the tubes 220 and fins 240 within the heat exchanger 210.

Figure 10:
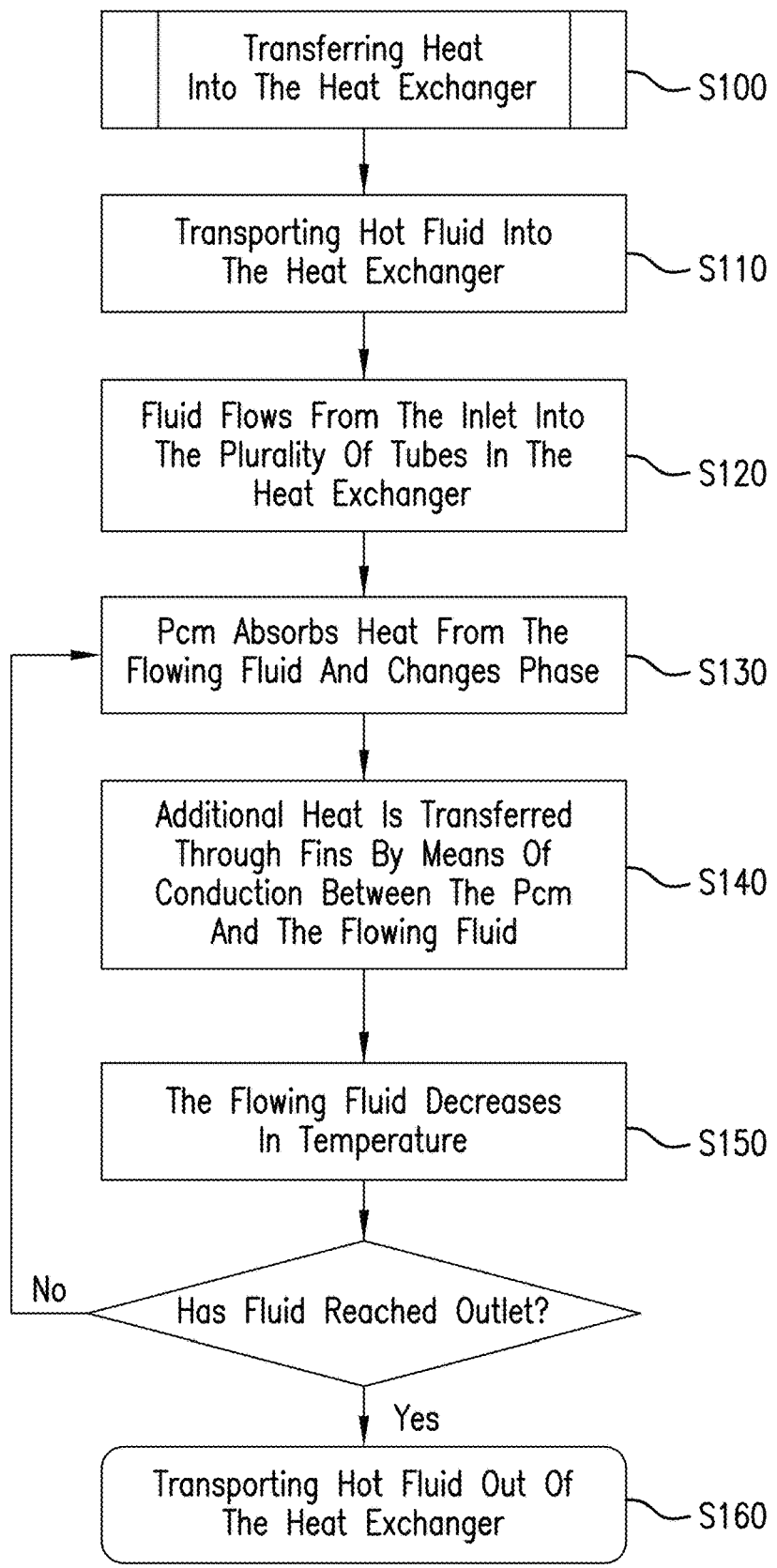
FIG. 10 illustrates a process of removing heat with the heat exchanger according to a disclosed embodiment.

Turning to FIG. 10, a process S100 of transferring heat into the heat exchanger 210 is illustrated. The process includes step S110 of transporting hot fluid into the inlet 300 of the heat exchanger 210. At step S120 the fluid flows from the inlet 300 into the plurality of tubes 220 in the heat exchanger 200. At step S130 while the fluid is flowing through the plurality of tubes 220, PCM 330 absorbs heat from the flowing fluid, PCM 330 changes phase. It is during this time that the PCM 330 expands through the through-holes 250 in the fins 240. For example, the PCM is wax, and the wax absorbs heat, melts, and is capable of expanding through the heat exchanger 210 by means of the through holes 250. At step S140 additional heat is transferred through fins 240 by means of conduction between the PCM 330 and the flowing fluid. It is during this time that the fins 240 function as a structural support for the plurality of tubes 220. At step S150, the flowing fluid decreases in temperature. Steps S130-S150 are continue until fluid has reached the outlet 310 then step S160, the cooled fluid is transported out of the heat exchanger 210 through the outlet 310. Upon cooling, the PCM 330 solidifies, and contracts as may be needed through the through holes 250.

Figure 11:
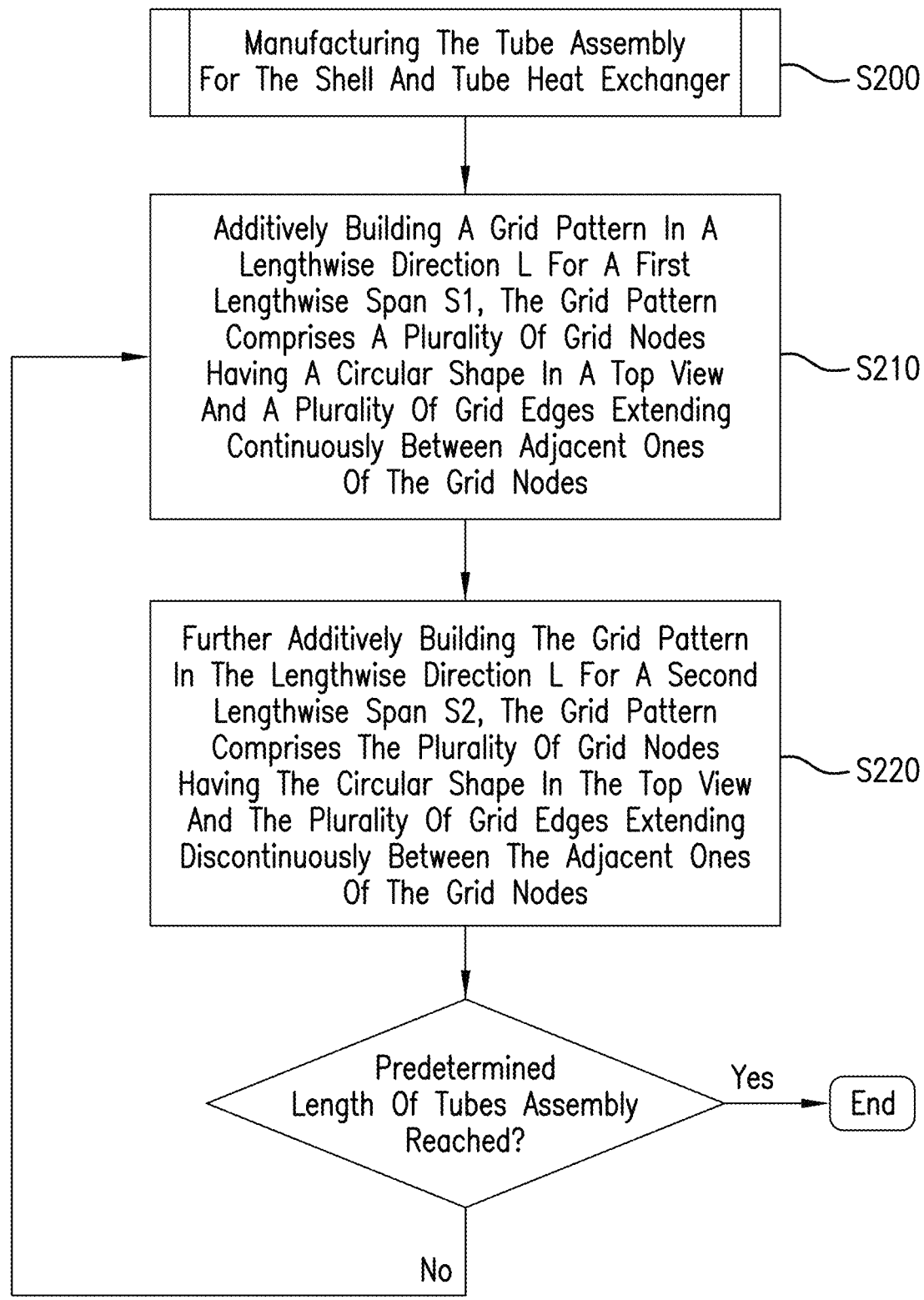
FIG. 11 illustrates a process of manufacturing a tube assembly according to an embodiment.

Turning to FIG. 11, one method of manufacturing the assembly 200 is disclosed. The assembly 200 may be manufactured using metal powder bed fusion techniques or other additive manufacturing (AM) processes. Utilizing AM may enable reduce or eliminate brazing the assembly, as brazing may weaken materials and the resulting assembly may be prone to leaks. The disclosed process is not intended to be limiting as the fins 240 may be made with various forms of through-holes 250 that allow the PCM to expand and contract in the heat exchanger 210.

With reference to FIGS. 2-4 and 11, disclosed is a process S200 of manufacturing the tube assembly 200 for the shell and tube heat exchanger 210. The process S200 includes step S210 of additively building a grid pattern 235 in a lengthwise direction L. The grid pattern 235 S210 comprises a plurality of grid nodes 236 having a circular shape in a top view and a plurality of grid edges 242 extending continuously between adjacent ones of the grid nodes 236.

The process S200 further includes additively building within the grid pattern 235, between the nodes 236 and aligned with the grid edges 242, a plurality of holes 250 distributed in the lengthwise direction L. The plurality of holes 250 are mutually spaced by a first span S1 and have a diameter S2.

Steps S210 and S220 are repeated until the desired length of the assembly 200 is formed. From this, the plurality of tubes 220 are formed which extend in the lengthwise direction L and the respective plurality of fins 240 connect the adjacent ones of the plurality of tubes 220. Moreover, the plurality of fins 240 each include a plurality of through holes 250 distributed in the lengthwise direction L. It is to be appreciated that the inlet 300 and the outlet 310 may be fabricated using additive manufacturing at the same time as the grid pattern, resulting in a unitary, integrated structure.

The above disclosed embodiments provide interconnecting tubes 220 of a shell and tube heat exchanger 210 that uses a phase change material (PCM) 330. The fins 240 may be connected to the tubes 220 in triangular, hexagonal, or other patterns. The fins 240 may improve structural integrity of the heat exchanger 210. The fins 240 may also function as heat fins to increase thermal conductance into the PCM 330 when the heat exchanger 210 is, for example, metal.

The term "about" is intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A tube assembly for a shell and tube heat exchanger, the tube assembly comprising:
   a plurality of tubes respectively extending in a lengthwise direction L to a respective plurality of opposing ends at respective opposing internal ends of the heat exchanger, the plurality of tubes being collectively arranged in a first grid pattern, wherein the plurality of tubes form a respective plurality of grid nodes, wherein the grid forms a row and column grid and at least a portion of the grid forms a square grid; and
   a plurality of fins that extend in the lengthwise direction L to opposing ends of the plurality of tubes and connecting the plurality of tubes so that the fins form a second transverse direction T2 wherein the plurality of fins each include a plurality of through holes formed therein.

2. The assembly of claim 1, wherein each of the plurality of fins connects adjacent ones of the plurality of tubes.

3. The assembly of claim 2, wherein on each of the fins, the through holes are aligned in the lengthwise direction.

4. The assembly of claim 1, wherein a perimeter shape of the grid in the top view is an octagon.

5. A shell and tube heat exchanger comprising:
   an inlet;
   an outlet;
   a cylindrical shell between the inlet and the outlet; and
   a tube assembly disposed within the cylindrical shell that fluidly connects the inlet and the outlet, the assembly including:
   a plurality of tubes respectively extending in a lengthwise direction L to a respective plurality of opposing ends at respective opposing internal ends of the heat exchanger, the plurality of tubes being collectively arranged in a first grid pattern, wherein the plurality of tubes form a respective plurality of grid nodes, wherein the grid forms a row and column grid and at least a portion of the grid forms a square grid; and
   a plurality of fins that extend in the lengthwise direction L to opposing ends of the plurality of tubes and connecting the plurality of tubes so that the fins form a second transverse direction T2, wherein the plurality of fins each include a plurality of through holes formed therein.

6. The heat exchanger of claim 5 comprising a phase change material (PCM).

* * * * *